US012593759B2

(12) United States Patent
Andreev et al.

(10) Patent No.: US 12,593,759 B2
(45) Date of Patent: Apr. 7, 2026

(54) LIGHT, APPARATUS AND METHOD FOR GROWING PLANTS

(71) Applicant: WÜRTH ELEKTRONIK EISOS GMBH & CO. KG, Waldenburg (DE)

(72) Inventors: Zhelio Andreev, Schwäbisch Hall (DE); Harun Özgür, Heilbronn (DE); Klaus Richter, Abstatt (DE)

(73) Assignee: WÜRTH ELEKTRONIK EISOS GMBH & CO. KG, Waldenburg (DE)

( * ) Notice: Subject to any disclaimer, the term of this patent is extended or adjusted under 35 U.S.C. 154(b) by 0 days.

(21) Appl. No.: 18/551,819

(22) PCT Filed: Jan. 31, 2022

(86) PCT No.: PCT/EP2022/052174
§ 371 (c)(1),
(2) Date: Sep. 21, 2023

(87) PCT Pub. No.: WO2022/199910
PCT Pub. Date: Sep. 29, 2022

(65) Prior Publication Data
US 2024/0172603 A1      May 30, 2024

(30) Foreign Application Priority Data

Mar. 24, 2021    (DE) ..................... 10 2021 202 877.2

(51) Int. Cl.
*A01G 9/24*        (2006.01)
(52) U.S. Cl.
CPC .................................. *A01G 9/249* (2019.05)
(58) Field of Classification Search
CPC .......... A01G 9/249; F21V 33/00; Y02P 60/21

USPC .............................................................. 47/17
See application file for complete search history.

(56) References Cited

U.S. PATENT DOCUMENTS

| | | | | |
|---|---|---|---|---|
| 4,348,833 A * | 9/1982 | Nagoya | ................... | A01G 9/242 |
| | | | | 47/17 |
| 5,946,852 A * | 9/1999 | Oram | ...................... | A01G 7/045 |
| | | | | 362/85 |
| 6,688,759 B1 * | 2/2004 | Hadjimichael | ........ | A01G 9/249 |
| | | | | 362/406 |
| 10,544,906 B1 * | 1/2020 | Openiano | ............... | F21K 9/232 |
| 10,667,468 B1 * | 6/2020 | Tang | ...................... | A01G 9/249 |

(Continued)

FOREIGN PATENT DOCUMENTS

| | | |
|---|---|---|
| CN | 206637333 U | 11/2017 |
| CN | 207831141 U | 9/2018 |

(Continued)

OTHER PUBLICATIONS

Office Action issued in parallel Russian Patent Application No. 2023 124 367, Jun. 20, 2024, 7 pages w/translation.

(Continued)

*Primary Examiner* — Timothy D Collins
*Assistant Examiner* — Maria E Graber
(74) *Attorney, Agent, or Firm* — HSML P.C.

(57)        ABSTRACT

A light for growing plants includes at least one light source for generating light for growing at least one plant to be grown, at least one detection device for detecting at least one state parameter of the plant, and at least one adjustment device for moving the at least one light source relative to the plant depending on the at least one state parameter.

20 Claims, 6 Drawing Sheets

(56)                References Cited

U.S. PATENT DOCUMENTS

| 10,842,082 | B1 * | 11/2020 | Genga, Jr. | A01G 9/249 |
| D907,829 | S * | 1/2021 | Rajasekaran | D26/63 |
| D917,089 | S * | 4/2021 | Rajasekaran | F21S 2/005 |
| | | | | D26/2 |
| 11,990,569 | B2 * | 5/2024 | Goto | A01K 1/00 |
| 12,075,737 | B2 * | 9/2024 | Feng | A01G 9/249 |
| 2012/0174478 | A1 * | 7/2012 | Chen | F24S 20/67 |
| | | | | 47/17 |
| 2017/0105265 | A1 * | 4/2017 | Sadwick | F21K 9/278 |
| 2017/0299797 | A1 * | 10/2017 | Ezell | H05B 45/10 |
| 2018/0010776 | A1 * | 1/2018 | Shim | F21K 9/232 |
| 2022/0346327 | A1 * | 11/2022 | Montagano | A01G 9/249 |

FOREIGN PATENT DOCUMENTS

| CN | 207995713 | U | 10/2018 |
| CN | 209234364 | U | 8/2019 |
| CN | 110521578 | A | 12/2019 |
| CN | 110762405 | A | 2/2020 |
| CN | 211146185 | U | 7/2020 |
| CN | 211649927 | U | 10/2020 |
| DE | 20 2020 107 200 | U | 2/2021 |
| JP | 2003-333929 | A | 11/2003 |
| JP | 2013-153691 | A | 8/2013 |
| JP | 3201212 | U | 11/2015 |
| WO | 2007/105946 | | 9/2007 |
| WO | 2010/109395 | A | 9/2010 |
| WO | 2014/013400 | | 1/2014 |
| WO | 2020/065050 | | 4/2020 |
| WO | WO-2021022373 | A1 * | 2/2021 | H05B 47/10 |

OTHER PUBLICATIONS

Examination Report issued in corresponding German Patent No. 10 2021 202 877.2, Nov. 2, 2021, 6 pages.

Decision to Grant issued in corresponding German Patent No. 10 2021 202 877.2, Apr. 25, 2022, 6 pages.

Examination Report issued in corresponding European Patent Application No. 22702726.5, Mar. 2, 2023, 4 pages.

International Search Report issued in International Application No. PCT/EP2022/052174, May 3, 2022, 6 pages w/translation.

Search Report issued in Taiwanese Patent Application No. 111107097, Mar. 24, 2021, 1 page.

Office Action issued in corresponding Canadian Patent Application No. 3,213,185, Aug. 21, 2024, 6 pages.

Office Action issued in corresponding Japanese Patent Application No. 2023-558566, Oct. 8, 2024, 17 pages w/translation.

Office Action issued in corresponding Chinese Patent Application No. 202280023914.2, Aug. 12, 2025, 21 pages w/translation.

* cited by examiner

LIGHT, APPARATUS AND METHOD FOR GROWING PLANTS

CROSS-REFERENCES TO RELATED APPLICATIONS

This application claims the priority of German Patent Application, Serial No. DE 10 2021 202 877.2, filed Mar. 24, 2021, the content of which is incorporated herein by reference in its entirety as if fully set forth herein.

FIELD OF THE INVENTION

The invention relates to a light and an apparatus for growing plants. The invention moreover relates to a method for growing plants.

BACKGROUND OF THE INVENTION

Lights for growing plants are known from the prior art.

SUMMARY OF THE INVENTION

It is an object of the present invention to improve a light for growing plants, in particular to specify a light which enables efficient illumination of a plant to be grown.

This object is achieved by a light for growing plants, including at least one light source for generating light for growing at least one plant to be grown, at least one detection device for detecting at least one state parameter of the at least one plant to be grown, and at least one adjustment device for moving the at least one light source relative to the at least one plant to be grown depending on the at least one state parameter detected by the at least one detection device. The light includes at least one light source for generating light for growing at least one plant to be grown and at least one detection device for detecting at least one state parameter of the at least one plant to be grown. Moreover, the light includes at least one adjustment device for moving the at least one light source relative to the at least one plant to be grown depending on the at least one state parameter detected by the at least one detection device. The at least one adjustment device is configured in particular to automatically move the at least one light source relative to the at least one plant to be grown depending on the at least one detected state parameter. Due to the movement of the at least one light source, its relative position, in particular its distance, in relation to the at least one plant to be grown can be set depending on the at least one state parameter, in particular optimized. The plant light, in particular its geometry, is adaptable to the requirements of the at least one plant to be grown. This promotes healthy and efficient plant growth.

Due to the movement of the at least one light source relative to the at least one plant to be grown, moreover unnecessary scattered light not incident on the plant is reduced, in particular avoided. In this way, the energy efficiency of the light is improved. The light enables efficient and inexpensive growing of plants.

The movement of the at least one light source relative to the at least one plant to be grown can in particular take place continuously or step-by-step depending on a change of the at least one state parameter, preferably depending on a growth of the at least one plant to be grown. The relative position of the at least one light source can preferably be adaptable continuously or step-by-step to a growth of the at least one plant to be grown. For example, the movement of the at least one light source can take place in such a way that the best possible coverage of the at least one plant to be grown by the light cone of the at least one light source is ensured. The at least one plant to be grown can be optimally supplied with light at all times.

The light is used to grow at least one plant to be grown. The plant growth can extend over one or more vegetation phases of the at least one plant to be grown, in particular over the seedling phase, the growth phase, the flow-ering phase, the reproduction phase, and/or the harvesting phase. The at least one plant to be grown can be provided at least at the beginning of the plant growth in particular as a plant seed, sprouted plant seed, seedling, and/or mature plant. The relative position of the at least one light source is adaptable via the at least one adjustment device in particular to different vegetation phases of the at least one plant to be grown.

The at least one state parameter can in particular be a size, a leaf area index (LAI), a water content, a nutrient content, in particular a sugar content, a vegetation phase, in particular a growth phase, and/or a temperature of the at least one plant to be grown. Additionally or alternatively, a moisture content of a plant substrate and/or the ambient air and/or a temperature of the ambient air and/or a plant substrate also comes into consideration as a state parameter. The at least one state parameter is preferably a growth parameter of the at least one plant to be grown. A growth parameter is under-stood here and hereinafter as a state parameter which permits conclusions about a plant growth of the at least one plant to be grown. Exemplary growth parameters are, in particular, the size, the vegetation phase, in particular the growth phase, and/or the leaf area index of the at least one plant to be grown. The movement of the at least one light source can preferably take place depending on the size of the plant and/or its vegetation phase, in particular growth phase. The movement of the at least one light source can in particular take place continuously or step-by-step depending on the size and/or the vegetation phase of the at least one plant to be grown.

The at least one adjustment device is configured in particular to move the at least one light source automatically, in particular fully automatically, relative to the at least one plant to be grown depending on the at least one detected state parameter. For example, the at least one adjustment device includes an evaluation unit for evaluating the at least one state parameter and/or for controlling the movement of the at least one light source depending on the at least one state parameter.

The movement of the at least one light source can in particular be carried out in a motorized, hydraulic, and/or pneumatic manner. The movement of the at least one light source is preferably carried out by a drive of the at least one adjustment device. The at least one adjustment device preferably includes a motorized, in particular electric motorized, hydraulic, and/or pneumatic drive. The drive can be activated, for example, by an evaluation unit of the at least one adjustment device depending on the at least one state parameter.

The light includes at least one light source for generating light for the growth of the at least one plant to be grown. The light generated with the aid of the at least one light source is irradiated onto the at least one plant to be grown. The light preferably includes a plurality of light sources. A plurality of light sources enables better coverage of the at least one plant to be grown with light to be irradiated.

The at least one light source preferably includes at least one LED. LEDs are robust and energy efficient. In particular, the at least one light source includes at least one multicolored LED.

An emission characteristic of the at least one light source is particularly preferably variable. For example, the light spectrum and/or intensity of the light that can be generated by the at least one light source can be variable. In particular, the emission characteristic of the at least one light source can be adaptable depending on the at least one state parameter of the at least one plant to be grown. For example, a light spectrum of the at least one light source can be adaptable to a respective vegetation phase, in particular growth phase, of the at least one plant to be grown. LEDs having adaptable emission characteristic, in particular adaptable light spectrum, have proven to be particularly suitable.

A light in which the at least one adjustment device includes a linear drive, in particular a spindle drive is robust and enables a precise movement of the at least one light source. In particular, a spindle drive enables a continuous movement of the at least one light source. The light, in particular its geometry, is continuously adaptable to the at least one state parameter of the plant. The linear drive, in particular the spindle drive, enables a linear movement of at least parts of the light. In particular, a height adjustment of the light, in particular the at least one light source, can be carried out in this way. The light is particularly well adaptable to a changing size of the at least one plant to be grown.

The linear drive, in particular the spindle drive, can include a motor, for example, in particular an electric motor. A torque motor has proven to be particularly suitable. The rotational movement of a motor can be converted into a linear movement in particular by a spindle drive.

A light in which the at least one adjustment device includes at least one boom pivotably mounted in relation to a light base body is particularly flexibly settable and stable. A pivotably mounted boom enables a movement of the at least one light source relative to the light base body. A movement of the light base body is not required. The at least one light base body can in particular be fixed in place. The stability of the lamp is increased in this way. The light base body can be, for example, a stand of the light.

The pivotably mounted boom enables a simple and targeted movement of the at least one light. In particular, the at least one boom is pivotable around a horizontal axis.

The light preferably includes a plurality of booms mounted pivotably on the light base body. For example, the booms can originate in a star shape from a light base body designed as a stand. The booms can in particular be arranged symmetrically with respect to the light base body. For example, the light includes four booms each offset by 90° from one another.

Multiple booms can in particular be arranged like an umbrella on the light base body. The pivoting of the booms thus causes opening or closing of the umbrella formed by the booms. An adjustment of the lamp geometry in height and width is possible in a simple manner in this way.

A light in which the at least one boom is coupled via a coupling element to a linear drive, in particular to a spindle nut of a spindle drive, of the at least one adjustment device is stable and precisely adjustable. The at least one boom is pivotable in a simple and precise manner by the coupling element. The pivot takes place in particular in a guided manner. A linear movement generated with the aid of the linear drive, in particular the spindle drive, is convertible by the coupling element into a pivot movement of the at least one boom. Preferably, one coupling element is provided per boom.

The coupling element is embodied in particular in the form of a coupling rod. The coupling rod is operationally connected in particular to respective booms and the linear drive, in particular the spindle nut. The coupling rod can in particular be fastened, for example pivotably fastened, on the respective boom and/or the linear drive, in particular the spindle nut.

The coupling rod preferably forms a guide gearing for the at least one boom. The coupling rod can, for example, be rigidly connected to the linear drive, in particular to the spindle nut of the spindle drive. The coupling rod can, for example, be arranged displaceably, in particular displaceably along a guide, and/or pivotably on the respective boom. For example, the coupling rod is arranged, in particular fastened, via a torsion compensation element on the respective boom. The guide gearing is simply designed, stable, and reliable.

A light in which the at least one light source is movable, in particular movable in a guided manner, along the at least one boom is particularly flexible. The ability to move the at least one light source along at least one boom of the adjustment device enables the movement by a further degree of freedom. In particular, the movement by a further degree of freedom can take place in addition to the height adjustment of the base body and a pivotability of the at least one boom. This increases the flexibility in the movement of the at least one light source. The position of the at least one light source is particularly precisely adaptable to the at least one state parameter, in particular the size, of the at least one plant to be grown. The movement of the at least one light source along the at least one boom preferably takes place depending on the pivot position of the boom.

The at least one light source is preferably arranged on at least one substrate, in particular on at least one flexible substrate. The at least one substrate is particularly preferably movable along the at least one boom, in particular movable in a guided manner. The at least one substrate having the at least one light source can form, for example, at least one light band.

The at least one light source is in particular movable in a guided manner along the boom, in particular displaceable in a guided manner. For example, the at least one boom can include a guide rail for the at least one substrate, on which the at least one light source is arranged, in particular for a light band.

A light in which the at least one light source is coupled to a linear drive of the at least one adjustment device, in particular to a spindle nut of a spindle drive is simply designed and reliable. Due to the coupling of the at least one light source to the linear drive, in particular to the spindle nut of the spindle drive, a movement of the at least one light source by the linear drive is ensured. A separate drive for the movement of the at least one light source along the at least one boom is not required.

In particular, at least one substrate, in particular at least one flexible substrate, on which the at least one light source can preferably be arranged, is coupled to the linear drive, in particular the spindle nut of the spindle drive. The at least one substrate can be fastened, for example, at an end, in particular at a front end, to the linear drive, in particular to the spindle nut.

The at least one boom and the at least one light source, in particular its at least one substrate, are preferably coupled to the linear drive, in particular to the spindle nut. This ensures a simultaneous movement matched with one another of the at least one boom and the at least one light source. In particular, a movement of the at least one light source along the at least one boom depending on its pivot position is ensured.

A light in which the at least one light source is arranged on at least one flexible substrate is flexible and long-lived. The flexible substrate is easily and reliably adaptable to a movement caused by the adjustment device. Reliable fastening of the at least one light source during its movement is ensured in this way. Unnecessary wear is avoided.

The at least one flexible substrate in particular includes a flexible circuit board. A flexible circuit board enables a reliable power supply and activation of the at least one light source. Preferably, a plurality of light sources, in particular a plurality of LEDs, is arranged on the at least one flexible substrate. The flexible substrate can be a light band, in particular an LED band. The light preferably includes one flexible substrate, in particular one light band, per boom.

A light in which the at least one flexible substrate is movable, in particular movable in a guided manner, along at least one boom of the at least one adjustment device is particularly flexible. The mobility of the at least one flexible substrate along at least one boom of the adjustment device increases the flexibility in the movement of the at least one light source. The position of the at least one light source is particularly precisely adaptable to the at least one state parameter, in particular the size, of the at least one plant to be grown. The movement of the at least one flexible substrate along the at least one boom preferably takes place depending on the pivot position of the boom.

The at least one flexible substrate is in particular movable in a guided manner, in particular displaceable in a guided manner, along the boom. For example, the at least one boom can include a guide rail for the at least one flexible substrate, in particular the light band. Preferably, one flexible substrate, in particular one light band, is displaceable in a guided manner per boom in a respective guide rail.

A light in which the at least one flexible substrate is coupled to a linear drive of the at least one adjustment device, in particular to a spindle nut of a spindle drive is simply designed and reliable. Due to the coupling of the at least one flexible substrate with the linear drive, in particular with the spindle nut of the spindle drive, a movement of the at least one flexible substrate by the linear drive is ensured. A separate drive for the movement of the at least one flexible substrate is not necessary. The at least one flexible substrate can be fastened, for example, at an end, in particular at a front end, to the linear drive, in particular to the spindle nut.

The at least one boom and the at least one flexible substrate are preferably coupled to the linear drive, in particular to the spindle nut. This ensures a simultaneous movement matched to one another of the at least one boom and the at least one flexible substrate. In particular, a movement of the at least one flexible substrate along the at least one boom is ensured depending on its pivot position.

A light comprising at least two light sources, wherein the at least two light sources are arranged such that light is irradiable from at least two sides onto the at least one plant to be grown by means of the at least two light sources ensures particularly efficient light radiation onto the at least one plant to be grown. The radiation of light from at least two sides onto the at least one plant to be grown improves the light yield of the plant. In particular, not only marginal, for example upper leaves of the plant are irradiated with light. The arrangement of the at least two light sources is in particular such that at least one of the light sources irradiates light onto the plant from above and at least one further light source irradiates light laterally onto the at least one plant. The radiation of light can preferably take place with the aid of multiple light sources from above and at least two sides.

The light particularly preferably includes at least two light sources per flexible substrate, in particular per light band. The at least one flexible substrate can be arranged in particular such that light is irradiable from at least two sides onto the at least one plant to be grown by means of the at least two light sources of the flexible substrate. For example, the light band can be curved along an outer contour of the plant. It is ensured in particular by the arrangement of the flexible substrate that at least one of the light sources irradiates light onto the plant from above and at least one further light source irradiates light onto the at least one plant laterally.

A light in which the at least one detection device includes at least one spectrometer, in particular at least one NIR spectrometer, at least one distance sensor, and/or at least one 3D scanner is particularly well adaptable to the at least one plant to be grown. Distance sensors enable the positioning in a simple and efficient manner of the at least one light source relative to the at least one plant to be grown. 3D scanners, in particular laser scanners, allow the size of the plant to be measured. Suitable 3D scanners are, for example, lidar systems, ladar systems, and/or ToF cameras. Lidar is the abbreviation for the English term "light detection and ranging" or "light imaging, detection, and ranging". Ladar is the abbreviation for the English term "light amplification by stimulated emission of radiation detection and ranging". ToF is the abbreviation for the English term "time-of-flight". In particular, growth progress of the plant can be tracked particularly precisely using 3D scanners. The light is particularly precisely adaptable to the plant size.

A spectrometer, in particular a spectrometer for the near infrared range (NIR), also called an NIR spectrometer, enables a spectral analysis of radiation originating from the at least one plant to be grown. The spectral analysis permits conclusions about various state parameters of the at least one plant to be grown, for example, nutrient content, water content, size, and/or leaf area index. In particular, the respective vegetation phase, in particular a respective growth phase, of the plant can be determined.

The at least one detection device preferably includes at least one spectrometer, in particular an infrared spectrometer, in particular an NIR spectrometer. The reflectance of plant parts, in particular of leaves, is particularly high in the infrared range. The size of the plant, in particular the coverage with foliage, in particular the leaf area index, can therefore be determined particularly precisely. In this way, simple and reliable conclusions about the plant size and/or the vegetation phase, in particular the growth phase, are possible. The position and/or the emission characteristic of the at least one light source are particularly precisely adaptable to the respective state of the at least one plant to be grown. NIR spectroscopy has proven to be particularly suitable for measuring the water and/or nutrient content of the at least one plant to be grown. Conclusions can be drawn about the respective vegetation phase, in particular growth phase, of the plant by way of the water and/or nutrient content. Moreover, this information can be used to control, in particular to regulate, automatic irrigation and/or fertilizing of the at least one plant to be grown. For example, the quantity and/or quality of the nutrients in the plant can be determinable, in particular on the basis of the NIR absorption spectrum of the at least one plant to be grown. The illumination parameters, in particular the emission characteristic of the at least one light source, preferably the light spectrum of the at least one light source, can be adaptable to the quantity and/or quality of the nutrients in the plant such that the plant is stimulated to produce required nutrients.

In particular wavelengths from 700 nm to 10 000 nm, in particular 760 nm to 2500 nm, in particular 850 nm to 2500 nm are suitable for NIR spectroscopy. The infrared spectrometer, in particular the NIR spectrometer, particularly preferably enables a broadband spectral analysis of wavelengths between 700 nm and 10 000 nm, in particular between 850 nm and 2500 nm.

For near infrared spectroscopy, the NIR spectrometer records the near infrared radiation reflected from the at least one plant to be grown. The NIR spectrometer can be, for example, an NIR sensor. An exemplary suitable NIR sensor is described, for example, in DE 10 2019 102 176 A1.

The infrared radiation originating from the at least one plant to be grown, in particular its leaves, is in particular reflected infrared radiation. For this purpose, infrared radiation, in particular NIR radiation, is irradiable onto the at least one plant to be grown. For example, the light generated by means of the at least one light source and irradiated onto the plant can comprise infrared radiation. For example, the light spectrum of the at least one light source contains NIR radiation. Alternatively or additionally thereto, the detection device can include at least one NIR radiation source, for example, NIR LEDs and/or NIR lasers. The NIR radiation source preferably includes an NIR broadband emitter. An exemplary suitable infrared radiation source is described in DE 10 2018 101 974 A1. NIR radiation having wavelengths from 700 nm to 10 000 nm, in particular 760 nm to 2500 nm, in particular 850 nm to 2500 nm can preferably be generated by means of the NIR radiation source. With the aid of an NIR radiation source, the NIR radiation required for the NIR spectroscopy is irradiable in a particularly targeted manner. This increases the efficiency and measurement accuracy of the spectrometer.

The at least one detection device is preferably moved upon movement of the at least one light source by the at least one adjustment device. The detection takes into consideration a displacement of the at least one light source. The at least one detection device, in particular the at least one spectrometer, the at least one distance sensor, and/or the at least one 3D scanner can be arranged, for example, on one or more of the booms of the adjustment device. For example, the at least one detection device can be arranged directly on the at least one boom. Additionally or alternatively, the at least one detection device can be arranged on a flexible substrate of the at least one light source.

A mobility of the at least one detection device, in particular the at least one NIR spectrometer, moreover has the advantage that the location of the at least one sensor relative to the at least one plant to be grown can be varied. For example, measurements can be carried out in various relative positions. This enables particularly precise measurements. A repeated measurement is possible, for example, at the beginning of the respective plant growth. In this way, the precise starting state of the plant can be determined. The further parameters for the plant growth can be established starting from this determination. For example, it can be established from which plant size an emission characteristic of the at least one light source is varied.

The light can contain a data interface for receiving and/or transmitting data. The data interface can be wired and/or wireless. In particular, the data interface can be designed for data exchange via Bluetooth, WLAN, and/or mobile wireless, in particular 3G, 4G, and/or 5G. In particular, a connection to an app on a device, in particular a smartphone, of a user of the plant light can be produced via the data interface. With the aid of the data interface, for example, operating parameters and/or growth data can be transferred to the light. For example, information can be transmitted to the light about the plant to be grown, in particular about its plant genus and/or species. The light can be adapted optimally to the growth of the relevant plant on the basis of the growth data. For example, special operating parameters, which relate in particular to the adjustment of the light and/or a variation of the emission characteristic, can be transferred. Alternatively, such operating parameters can already be stored in a memory of the light for various plant genera and/or species. Data can also be output via the data interface. For example, data about the at least one detected state parameter can be output. For example, a message can be output to a user upon reaching a new vegetation phase.

A light comprising at least one secondary detection device for detecting at least one further state parameter of the at least one plant to be grown is particularly flexibly usable and user-friendly. In particular, the plants can be grown fully automatically. For example, the at least one secondary detection device includes a moisture sensor and/or temperature sensor. With the aid of a moisture sensor, for example, the moisture content of a plant substrate, the air, and/or the at least one plant to be grown can be determined. Irrigation can be controlled, in particular fully automatically, depending on the determined moisture content. A temperature required for the plant growth can be monitored, in particular controlled, with the aid of a temperature sensor.

It is a further object of the invention to improve an apparatus for growing plants.

This object is achieved by an apparatus for growing plants, including at least one light for growing plants according to the invention and at least one vessel for accommodating at least one plant substrate. The apparatus includes at least one light for growing plants as described above and at least one vessel for accommodating at least one plant substrate. The apparatus has the advantages of the above-described light. The vessel can be designed in particular for accommodating a plant substrate for a hydroculture. The apparatus is suitable in particular for growing plants hydroponically.

The apparatus can in particular be designed as modular. For example, various lights and various vessels can be combined to be adaptable to different ways of growing plants, in particular different plant sizes and/or different numbers of plants to be grown. Different vessels can be suitable, for example, for hydrocultures and/or the use of potting soil as a plant substrate. Moreover, different plant sizes can be taken into consideration via various vessels and/or plant lights.

An apparatus comprising at least one liquid reservoir and/or one fertilizer reservoir for supplying the at least one plant to be grown with liquid and/or fertilizer, in particular depending on at least one detected state parameter of the at least one plant to be grown is particularly versatile. In particular, plants can be grown fully automatically with the aid of the apparatus. With the aid of a liquid reservoir and/or fertilizer reservoir, irrigation and/or fertilizing of the plant adapted to the respective state parameters can take place. For example, it can be measured with the aid of a moisture sensor whether it is necessary to water the plant. Water content and/or nutrient content can also be determined in a simple and accurate manner with the aid of an NIR spectrometer. Irrigation and/or fertilizing can be optimally adapted to the respective state of the at least one plant to be grown. This improves the plant growth and the efficiency of the growing method.

The water reservoir and/or the fertilizer reservoir can in particular be part of the light. For example, the light in the light base body can include a filling opening for filling the water reservoir and/or fertilizer reservoir.

The apparatus, in particular the vessel, can also include an irrigation apparatus for automatic irrigation. In particular, the irrigation apparatus can be designed for drip irrigation.

The apparatus, in particular the vessel, can include a temperature regulating device, in particular a heater. The optimum temperature for growing plants can be ensured by the temperature regulating device.

It is a further object of the invention to improve a method for growing plants.

This object is achieved by a method for growing plants, comprising the following steps providing at least one plant to be grown, providing a light for growing plants according to the invention, irradiating light onto the at least one plant to be grown by means of the at least one light source, detecting at least one state parameter of the at least one plant to be grown by means of the at least one detection device, and moving the at least one light source relative to the at least one plant to be grown depending on the at least one state parameter by means of the at least one adjustment device.

First, at least one plant to be grown and a light as described above are provided. The above-described apparatus for growing plants is preferably provided. With the aid of the at least one light source of the light, light is irradiated onto the at least one plant to be grown. With the aid of the at least one detection device of the light, at least one state parameter of the at least one plant to be grown is detected. With the aid of the at least one adjustment device, the at least one light source is moved relative to the at least one plant to be grown depending on the at least one state parameter. The method has the advantages described with respect to the light. The plant growth can be promoted particularly advantageously using this method. Growing plants is efficient and energy saving.

The at least one plant to be grown can be provided in particular as a plant seed, sprouted plant seed, seedling, and/or mature plant. The method for growing plants can extend over one or more of the vegetation phases of the at least one plant to be grown, in particular the seedling phase, the growth phase, the blooming phase, the reproduction phase, and/or the harvesting phase.

A method in which a leaf area index and/or a size of the at least one plant is detected by means of the at least one detection device is adaptable particularly precisely to the different growth stages of the plant. The measurement can be carried out in particular using at least one spectrometer, preferably an NIR spectrometer, at least one distance sensor, and/or at least one 3D scanner.

A method in which an emission characteristic of the at least one light source is varied, in particular adapted, depending on the at least one state parameter detected is adaptable particularly well to the respective requirements of the plant. In particular, various growth stages of the at least one plant to be grown can be taken into consideration. The emission characteristic, in particular the spectrum and/or the intensity of the at least one light source, can be adapted to the respective state, in particular the vegetation phase, of the at least one plant to be grown.

A method in which at least one additional state parameter of the at least one plant to be grown, in particular its water content and/or nutrient content, is ascertained is usable in a particularly flexible and versatile manner. The determination of at least one additional state parameter permits even more precise consideration of the respective plant state. In particular the determination of a water content and/or nutrient content of the at least one plant to be grown enables fully automated irrigation and/or fertilizing of the plant. Not only the illumination, but also the supply of the plant with water and/or nutrients is optimally adaptable to the species of the plant and/or its respective state.

A method comprising a calibration step for determining a starting configuration of the light, in particular a position and/or an emission characteristic of the at least one light source, at the beginning of growing the plants is particularly versatile and precise. The calibration step can comprise, for example, the input of starting parameters. For example, a species or genus of a plant to be grown and/or specific requirements for growing the plant can be transferred via a data interface. The further growing method can be carried out depending on these starting parameters.

An automatic detection of the starting state, in particular the species or genus and/or the initial size of the plant to be grown, preferably takes place in the calibration step. The optimum starting configuration, in particular position and/or distance characteristic, of the at least one light source can thus be automatically selected. In the calibration step, the at least one state parameter can preferably be measured repeatedly with the aid of the at least one detection device, particularly preferably with different positions of the at least one detection device relative to the at least one plant to be grown.

The calibration step is particularly advantageous for modular devices for growing plants. Independently of the combination of light and vessel, an optimum adaptation of the light to the plant to be grown is ensured in this way.

A method in which the movement of the at least one light source takes place in at least two, in particular in at least three degrees of freedom is particularly flexible. Multiple degrees of freedom permit a particularly good adaptation of the position of the at least one light source relative to the plant. Possible degrees of freedom are in particular a vertical adjustability of the light, in particular a light base body, a pivotability of at least one boom and/or a mobility, in particular a displaceability, of the at least one light source along a boom, in particular a pivotable boom.

A method in which the movement in different degrees of freedom takes place in a coupled manner, in particular by a single drive is particularly precise and failsafe. The coupling of the movement in various degrees of freedom, in particular in at least three different degrees of freedom, enables a precise and matched movement of the at least one light source. The use of a single drive makes the light simply designed and failsafe.

Further features, advantages, and details of the invention result from the following description of preferred exemplary embodiments on the basis of the figures.

DESCRIPTION OF THE PREFERRED EMBODIMENTS

Figure 1:
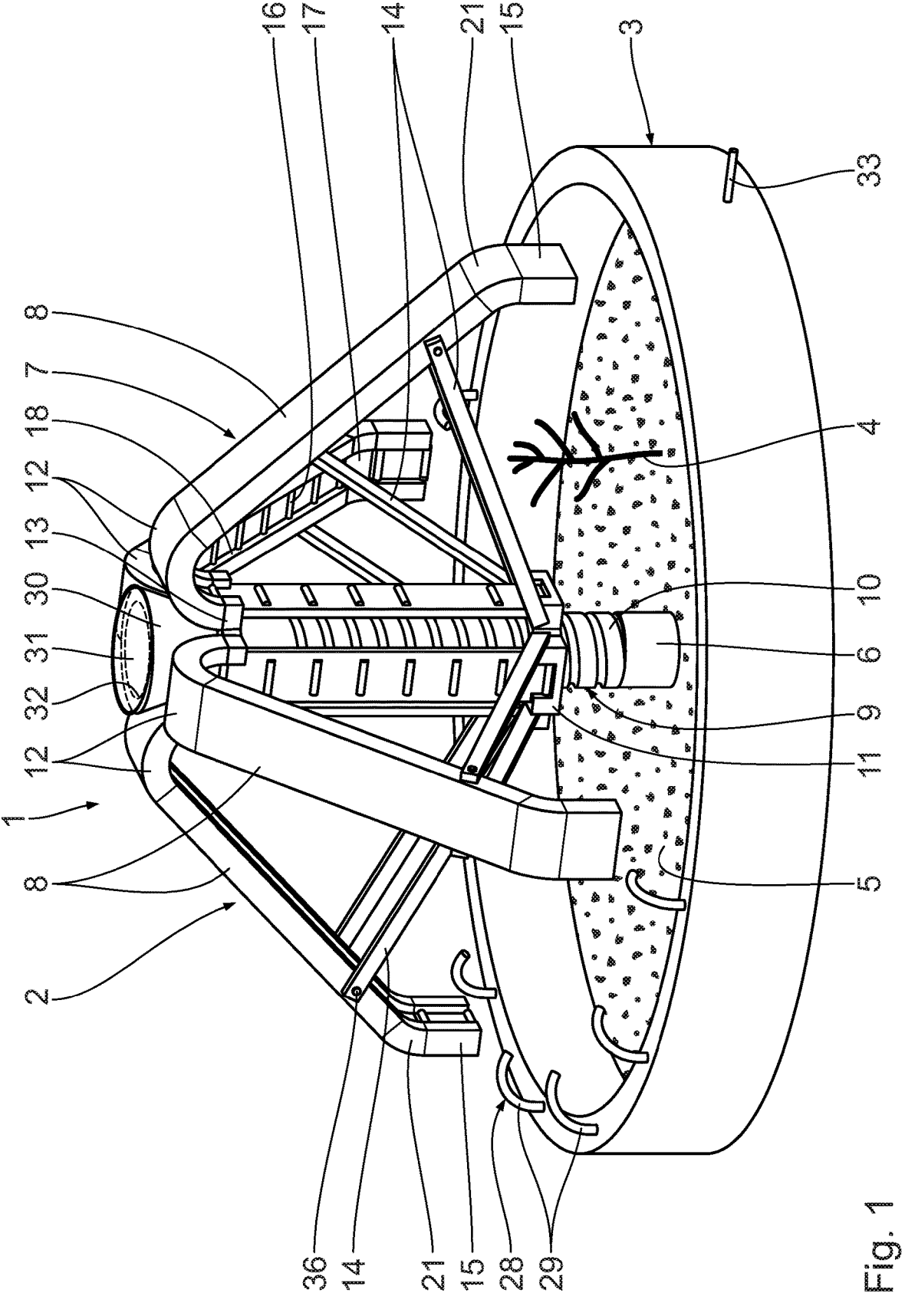
FIG. 1 shows a perspective view of an apparatus for growing plants having a light, wherein a geometry of the light is adapted to a small size of a plant to be grown.
Figure 2:
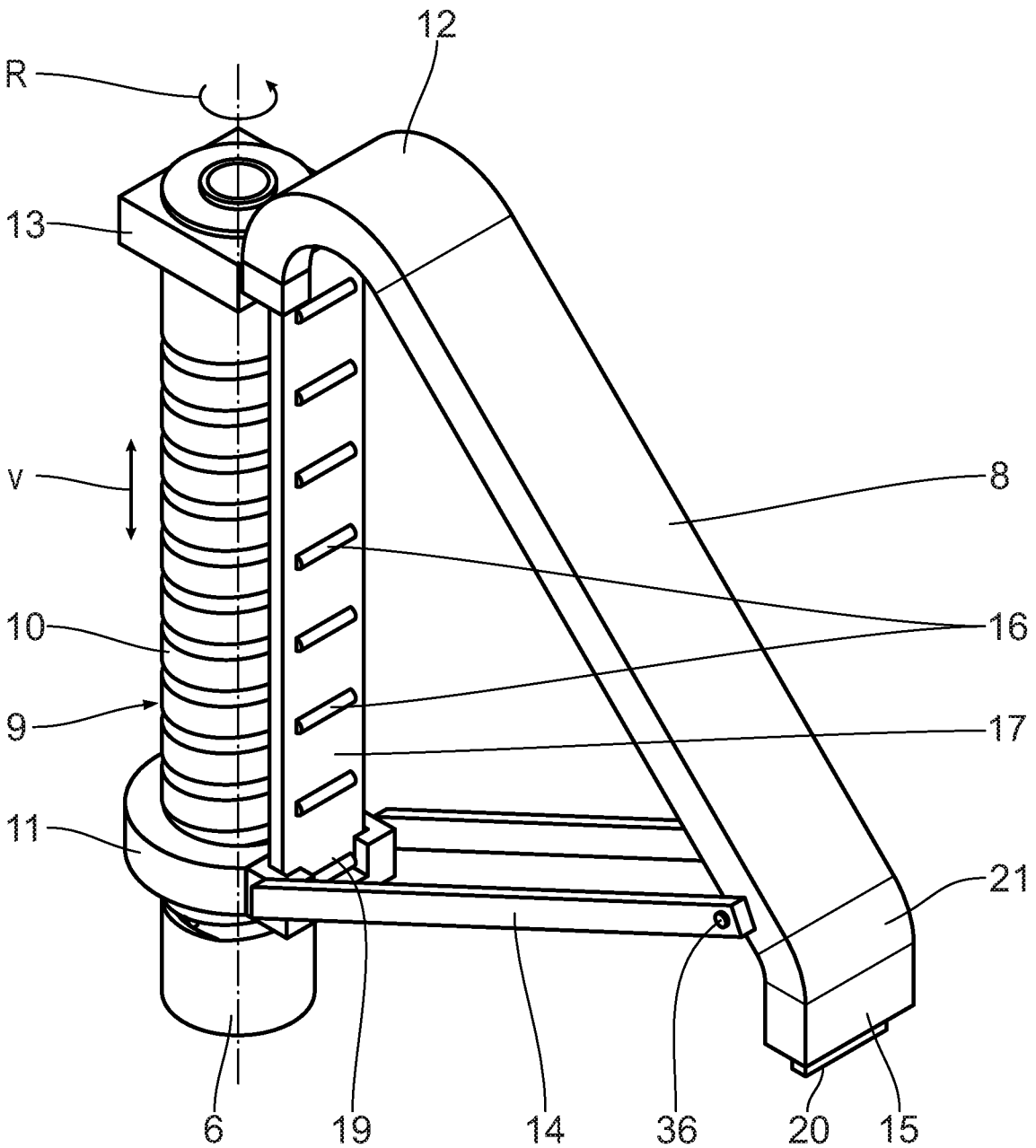
FIG. 2 shows a boom and the spindle drive of the light of FIG. 1.
Figure 3:
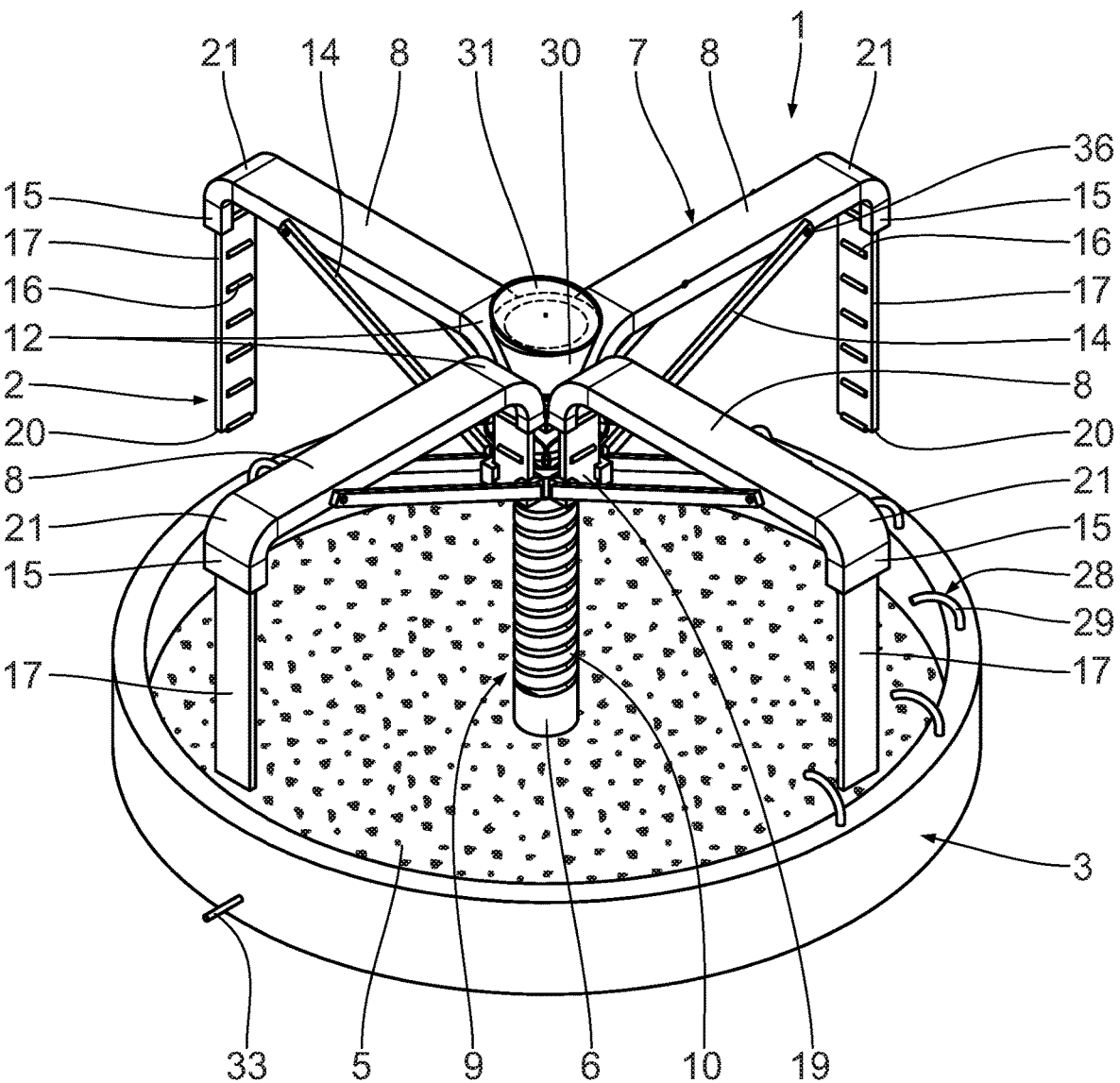
FIG. 3 shows a perspective view of the apparatus of FIG. 1, wherein a geometry of the light is adapted to a larger size of the plant to be grown.
Figure 4:
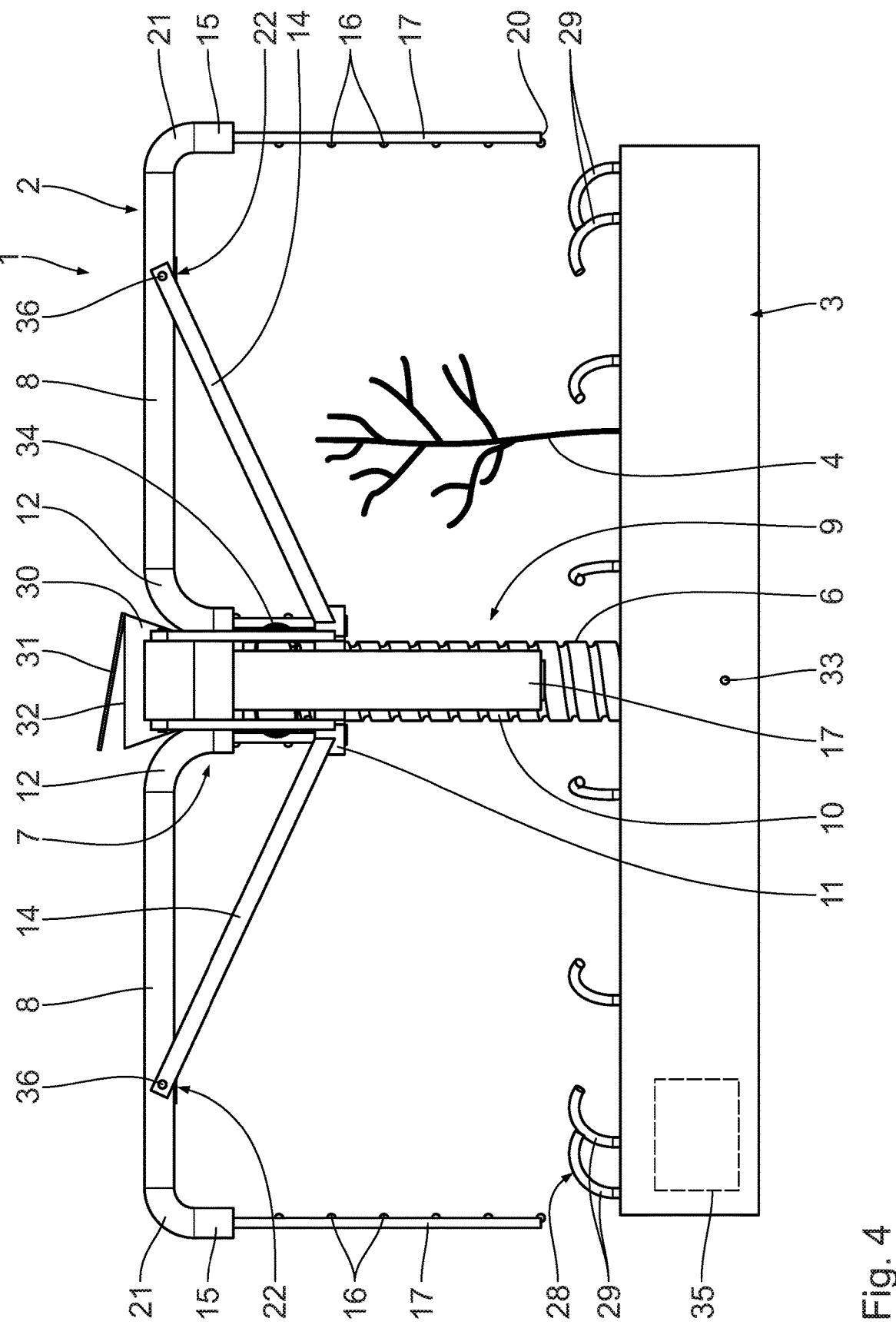
FIG. 4 shows a side view of the apparatus of FIG. 3.
Figure 5:
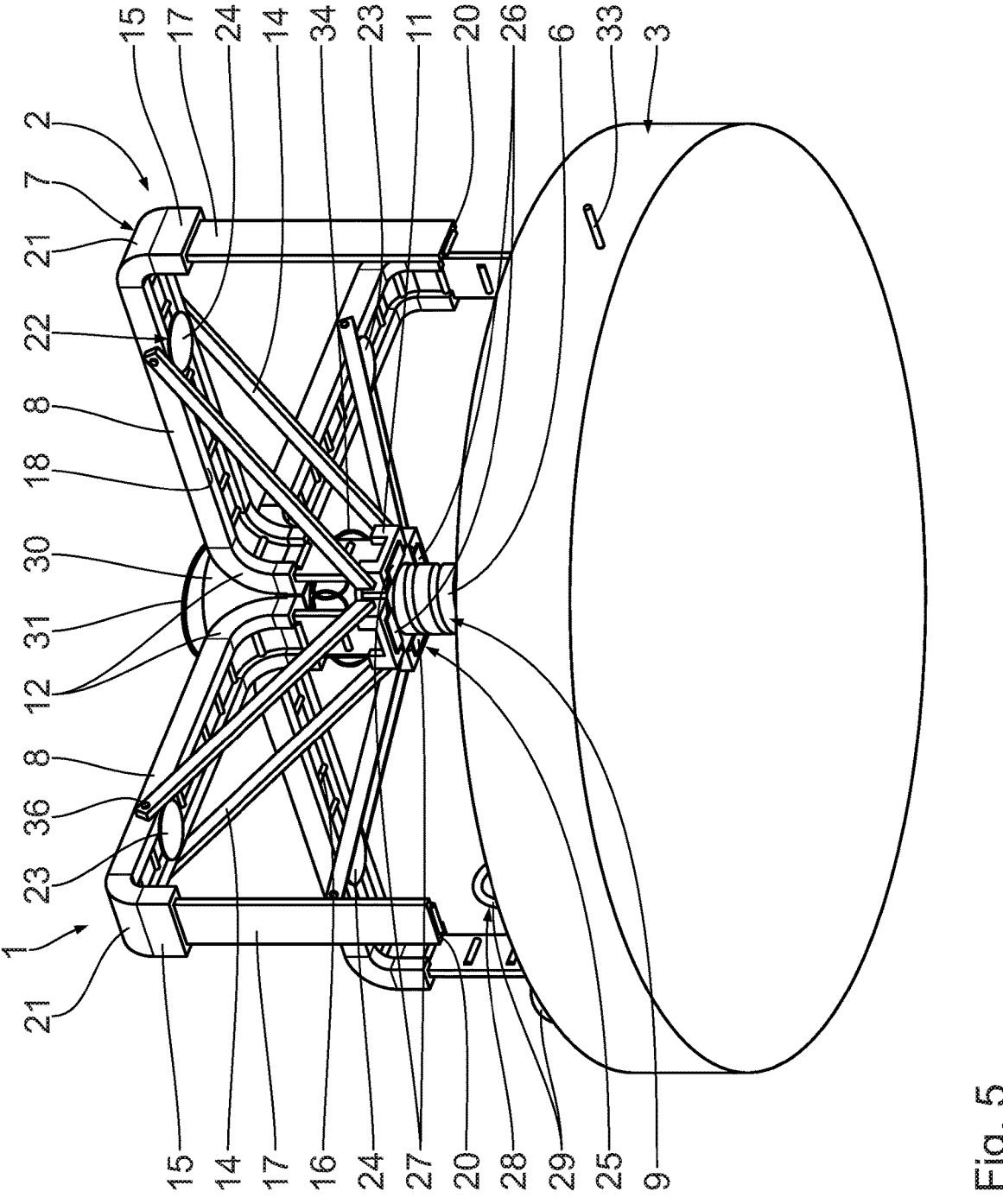
FIG. 5 shows a perspective view diagonally from below of the apparatus of FIG. 3.

An exemplary embodiment of an apparatus 1 for growing plants will be described on the basis of FIGS. 1 to 5. The apparatus 1 includes a light 2 for growing plants and a vessel 3. The light 2 is adaptable in its geometry to the growth of a schematically shown plant 4 to be grown. In FIG. 1, the plant 4 is shown at the beginning of growing the plant. The geometry of the light 2 is adapted to the size of the plant 4, which is only small. FIG. 2 shows individual components of the light 2 at the beginning of growing the plant. In FIGS. 3 to 5, the light is adapted to a plant growth of the plant 4 which has taken place in the meantime and thus to a larger size of the plant 4. For reasons of clarity, the grown plant 4 is only schematically shown in FIG. 4.

The container 3 forms a receptacle for a plant substrate 5 schematically shown in FIGS. 1 and 3. The plant 4 is planted in the plant substrate 5. The plant substrate 5 can be, for example, potting soil or a substrate for hydroculture. Only one plant 4 to be grown is schematically shown in the figures. However, due to the size of the container 3, multiple plants can also be planted in the plant substrate contained therein. For example, multiple plants can be grouped around the light 2.

The container 3 is embodied in one piece with the light 2. The light 2 includes a light base body 6. The light base body is designed in the form of a stand arranged centrally in the vessel 3.

The light 2 includes an adjustment device 7. The adjustment device 7 includes four booms 8 and a spindle drive 9. The spindle drive 9 includes a threaded spindle 10 and a spindle nut 11. The threaded spindle 10 is integrated in the plant base body 6. Upon rotation of the spindle nut 11, it travels in the vertical direction v along the threaded spindle (cf. FIG. 2).

The booms 8 are arranged in a star shape around the light base body 6. The booms 8 are pivotably mounted on a collar 13 via a flexible joint 12 (cf. FIG. 2). The collar 13 is rotatably arranged on the light base body 6. With the aid of the flexible joint 12, the booms 8 can be pivoted in relation to the collar 13 and thus in relation to the light base body 6. The pivot takes place around a horizontal pivot axis in the illustrated exemplary embodiment. The pivot takes place with the aid of the spindle drive 9.

The booms 8 are arranged like an umbrella on the light base body 6. During the adaptation of the light geometry, the umbrella formed by the booms 8 opens or closes.

The booms 8 are each coupled via a coupling element designed as a coupling rod 14 to the spindle nut 11. The coupling rods 14 are each rigidly arranged on the spindle nut 11. The coupling rods 14 are arranged on the respective boom 8 such that the coupling rods 14 are used as a guide gearing during the pivot of the booms 8. The coupling rods 14 are arranged on the respective boom 8 via a torsion compensation element 36.

The adjustment device 13 includes an electric motor in the form of a torque motor (not shown). The torque motor is arranged in the area of the light base body 6 at the height of the collar 13. The collar 13 can be set into rotation relative to the base body 6 by rotational drive of the torque motor. The booms 8 begin to rotate with the collar 13. The rotation is transmitted to the spindle nut 11 via the coupling rods 14. The rotation is schematically shown in FIG. 2 by the arrow R. The rotation is transmitted to the threaded spindle 11, whereupon it travels in the vertical direction v. The spindle nut moves upward or downward on the threaded spindle 10 depending on the rotational direction. The coupling rods 14 are also moved upward by the vertical movement of the threaded spindle. The coupling rods 14 act in this case as guide gearings, which cause a pivot of the booms 8 relative to the collar 13 and thus relative to the light base body 6. The pivot takes place around a horizontal pivot axis defined by the flexible joint 12. The pivoting results in a movement of the end 15 of the booms 8 facing away from the light base body 6.

During an upward movement of the spindle nut 11, a boom end 15 of the booms 8 is moved upward and laterally away from the light base body 6. The umbrella formed by the booms 8 opens. Upon an opposite movement of the spindle nut 11, thus upon a movement downward along the threaded spindle 10, the boom end is moved downward and laterally toward the light base body 6. The umbrella formed by the booms 8 closes.

In the exemplary embodiments shown in the figures, the booms 8 and, via this, the spindle nut 11 are set into rotation in order to cause a movement. In other exemplary embodiments (not shown), the light base body 6, or at least the threaded spindle 10, is rotatably mounted. The threaded spindle 10 is set into rotation by means of the motor so that a pivot of the booms 8 takes place, but not a rotation thereof. In still other exemplary embodiments, a linear displacement is carried out using other linear drives. Instead of a spindle drive, for example, a pneumatic and/or hydraulic drive can be used. The general concept of the movement of the light sources relative to the plant is independent of the adjustment device 7 specifically described here. Any other adjustment device which enables such a movement can be provided.

The light 2 includes a plurality of light sources in the form of LEDs 16. For reasons of clarity, only individual ones of the LEDs 16 are provided with reference signs in the figures. The LEDs 16 are arranged along flexible substrates 17. The flexible substrates 17 are formed by flexible circuit boards. The flexible substrates 17 are embodied in the form of a light band. One light band 17 having LEDs 16 is provided per boom 8. The light bands 17 are each guided in linear guides 18 of the booms 8. The light bands 17 are displaceable in a guided manner along the booms 18.

One end 19 of the light bands 17 is fastened on the spindle nut 11. During movement of the spindle nut 11 along the threaded spindle 10, the ends 19 of the light bands 17 are carried along. Carrying along the ends 19 of the light bands 17 causes a relative displacement of the light bands 17 in relation to the respective boom 8. A pivot of the booms 8 and a relative linear movement of the light bands 17 in relation to the booms 8 is therefore effectuated with the aid of the rotational drive. The rotational movement effectuates a movement of the LEDs 16 relative to the light base body 6 and thus relative to the plant 4 to be grown.

The adjustment device 7 is used to adapt the position of the LEDs 16 relative to the plant 4 to be grown. The light geometry of the light 2 is change-able by the adjustment device 7. Different light geometries of the light 2 are shown by way of example in FIGS. 1 or 3 to 5. The adjustment device 7 enables a continuous change of the light geometry. The different light geometries are also designated hereafter as adjustment states. A continuous adjustment and adaptation of the light 2 to the plant 4 is possible with the aid of the spindle drive 9.

An adjustment state is shown in FIG. 1 in which the booms 8 are pivoted downward as far as possible. The spindle nut 11 is in the area of the lower end of the threaded spindle 10. The light bands 17 extend above the spindle nut 11 along the threaded spindle 10. The light bands 17 therefore extend over a part of the light base body 6 designed as a stand. The light bands 17 are moreover guided within the linear guides 18 of the respective booms 8. The LEDs 16 therefore irradiate light onto the plant 4 from the side of the light base body 6 and from above from the direction of the booms 8. Due to the state folded downward, the light is also irradiated onto the plant 4 from the side opposite to the light base body. Due to the folded-in adjustment state, the light generated with the aid of the LEDs 16 is substantially bundled onto the plant 4. Scattered light is reduced. The light is therefore energy efficient. The light generated with the aid of the LEDs 16 can be used optimally for the illumination of the plant 4.

In the adjustment state shown in FIGS. 3 to 5, the spindle nut 11 is moved in the direction of the upper end of the threaded spindle 10. The booms 8 are pivoted upward in this way. The booms 8 extend essentially outward in the horizontal direction from the light base body 6 in this adjustment state. The booms 8 therefore enable coverage of a taller and wider plant 4. At the same time, the ends 19 of the light bands 17 are arranged in the area of the upper end of the threaded spindle 10. The light bands 17 are therefore displaced relative to the booms 8. The end 20 of the light bands 17 opposite to the end 19 therefore protrudes out of the linear guides 18 beyond the free boom end 15 of the booms 8. A flexible joint 21 is arranged at the boom end 15. It is ensured by the flexible joint 21 that the boom ends 15 hang downward following gravity. Accordingly, the light bands 17 hang laterally downward. Due to this arrangement of the light bands 17, the plant 4 is illuminated from above and from the side facing away from the light base body 6.

In each of the different adjustment states of the light 2, the plant 4 is illuminated from at least two sides. This increases the light yield when growing plants. Lower-lying leaves are not shaded by higher-lying leaves. Rather, light is introduced from various sides.

A movement of the LEDs 16 relative to the plant 4 is carried out by the adjustment device 7. The location of the LEDs 16 is therefore optimally adaptable to the respective state of the plant 4, in particular the size of the plant 4. The movement takes place fully automatically in the light 2.

The light 2 includes a detection device 22 for detecting a state parameter of the plant 4 (cf. FIG. 5). The detection device 22 includes NIR spectrometers 24 and NIR broadband emitters 23. The NIR broadband emitters 23 emit broadband infrared radiation onto the plant 4. Infrared radiation reflected from the plant 4, in particular its foliage, is detected with the aid of the NIR spectrometers 24. The spectrum of the reflected infrared radiation enables conclusions about the foliage and thus about the size of the plant 4. Moreover, a leaf area index can be ascertained via this. A water and/or nutrient content of the plant 4 can moreover be determined from the NIR spectrum. These state parameters of the plant 4 enable a growth state, in particular the size, and different vegetation phases, in particular growth phases, to be determined. Depending on the plant size and/or the vegetation phase, in particular the growth phase, the geometry of the light 2 is adapted to ensure optimum illumination of the plant 4 with the aid of the LEDs 16.

The LEDs 16 are adaptable in their emission characteristic. This means that intensity and spectrum of the light generated by means of the LEDs 16 is adapted to the respective state parameter determined with the aid of the detection device 22. An optimum plant growth is ensured in this way.

The adjustment device 7 includes an evaluation unit (not shown), which determines the at least one state parameter, in particular the size, the leaf area index, the water content, and/or the nutrient content of the plant 4 from the NIR spectrum. The adjustment device is activated to move the LEDs 16 relative to the plant 4 depending on this state parameter.

In the exemplary embodiment shown in the figures, the NIR broadband emitters 23 are arranged in two of the four booms 8 at the height of the connection between the coupling rods 14 and the respective boom 8. An NIR spectrometer 24 is arranged on each of the two other booms 8 at a corresponding point. In other exemplary embodiments (not shown), one NIR emitter 23 and one NIR spectrometer 24 can be arranged per boom 8.

In other exemplary embodiments (not shown), additionally or alternatively to the NIR spectrometers, other sensors can be provided. For example, distance sensors can be used for determining a distance between the LEDs 16 and the plant 4. The size of the plant can be concluded, for example, from the ascertained distance and the adjustment state. In still other exemplary embodiments, the shape and size of plant 4 can be detected with the aid of 3D scanners, in particular laser scanners, for example NIR laser scanners. The detection device particularly preferably includes at least one NIR spectrometer and at least one 3D scanner. In a preferred exemplary embodiment, 3D scanners, in particular laser scanners, and NIR spectrometers can be arranged alternately on the booms.

The light 2 includes a secondary detection device 25 for detecting at least one further state parameter of the plant 4. The secondary detection device 25 is arranged on the lower side of the spindle nut 11 (cf. FIG. 5). The secondary detection device 25 includes temperature sensors 26 and moisture sensors 27. A temperature of the plant 4 and/or its surroundings can be measured with the aid of the temperature sensors 26. The temperature de-sired for growing plants can be monitored by means of the temperature sensors 26. In some exemplary embodiments, the temperature can also be controllable. The vessel 3 can include a heater (not shown) for this purpose.

With the aid of the moisture sensors 27, an ambient humidity, soil moisture, and/or a water content of the plant 4 can be determined. Irrigation of the plant 4 can be adapted on the basis of the ascertained moisture values.

The vessel 3 includes an automatic irrigation device 28 having sprinklers 29. The apparatus 1 enables targeted irrigation of the plant 4, in particular drip irrigation. The irrigation takes place automatically on the basis of the moisture values determined with the aid of the moisture sensors 27 and/or a water content of the plant 4 determined with the aid of the NIR spectrometers 24. The irrigation device 28 includes a liquid reservoir 30. The liquid reservoir 30 is formed inside the light base body 6. The liquid reservoir 30 is fillable via a filling opening 32 closable by means of a flap 31.

The apparatus 1 moreover includes a fertilizer reservoir 35. The fertilizer reservoir is schematically shown in FIG. 4.

The fertilizer reservoir 35 enables automatic fertilization of the plant, in particular on the basis of a nutrient content of the plant 4 ascertained with the aid of the NIR spectrometers 24. In other exemplary embodiments (not shown), the fertilizer can also be supplied via the water reservoir and the irrigation device.

The apparatus 1 includes a power connector 33 formed in the container 3. The apparatus 1 can be supplied with power via the power connector 33. The light bands 17 are connected at their end 19 to wire loops 34 to supply the LEDs 16 with power. The wire loops 34 enable a power connection independently of a movement of the ends 19 of the light bands 17 along the spindle drive 10. In the area of the collar 13, the power terminal is produced via slip contacts, in particular for ground and/or positive pole. A further optional slip contact is used for data transmission, in particular for transmitting the data detected by means of the detection devices 22 and/or the secondary detection devices 25.

The light 2 includes a data interface (not explicitly shown) for exchanging data. The data interface is designed as a wireless data connection. In other exemplary embodiments (not shown), a wire-supported data interface can be produced, for example via the power connector 33. With the aid of the data interface, operating parameters and/or growing data with respect to the plant 4 can be transferred to the light 2. Alternatively or additionally, operating states of the light 2 can be output. In particular, state parameters of the plant 4 ascertained with the aid of the detection device 22 and/or the secondary detection device 25 can be output. For example, an output can take place when the plant 4 has reached a new growth stage. The data input or output can take place, for example, via a terminal of the user, in particular a smartphone and/or a tablet. For example, a special app can be provided for this purpose.

Figure 6:
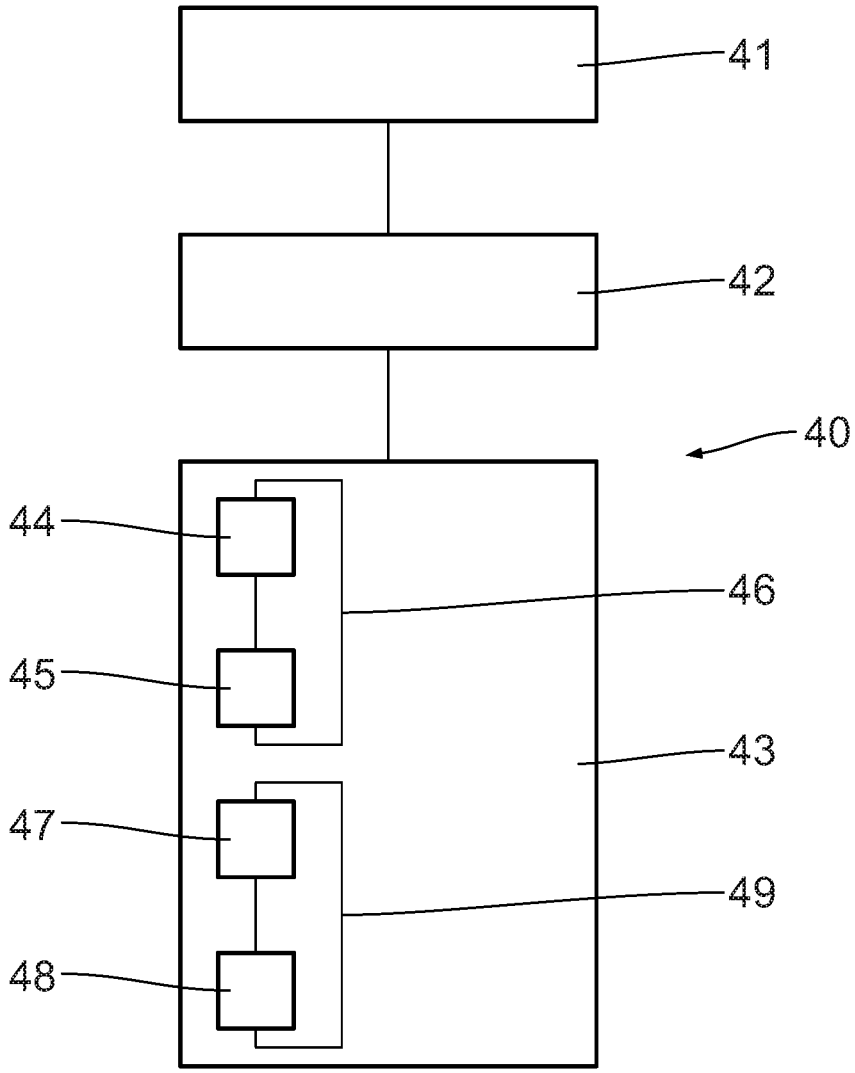
FIG. 6 shows a schematic method sequence of a method for growing plants.

A method 40 for growing plants will be described hereinafter with reference to FIG. 6.

In a provision step 41, at least one plant to be grown and a light for growing plants are provided. The provided light can be the above-described light 2. The light is preferably provided as part of the apparatus 1.

In a calibration step 42, the provided light is calibrated. For example, operating parameters and/or growing data, in particular the species or genus of the plant to be grown, can be transferred to the light. The light can also carry out an automatic identification of relevant operating parameters and/or growing data. In particular, state parameters of the plant to be grown can be determined by repeated measurement.

In a plant growing step 43, light is irradiated onto the at least one plant to be grown with the aid of at least one light source of the light. In plant growing step 43, at least one plant parameter is detected in a detection step 44. Depending on the detected state parameter, in an adjustment step 45, the at least one light source is moved relative to the plant to be grown with the aid of an adjustment device of the light. A state-dependent adaptation of the geometry of the light takes place in this way.

Detection step 44 and adjustment step 45 are carried out repeatedly, as indicated by the repetition loop 46. In particular, a continuous and/or step-by-step adaptation of the light geometry can take place.

Depending on the at least one state parameter of the plant to be grown detected in detection step 44, the emission characteristic, in particular the spectrum and/or the intensity, of the at least one light source is also adapted. In particular, the emission characteristic is adapted to a vegetation phase, in particular a growth phase, of the plant. The adaptation can take place in adjustment step 45.

In a secondary detection step 47, at least one further state parameter of the plant to be grown is detected. A corresponding adaptation is carried out in an adaptation step 48 depending on the further state parameter. For example, a water and/or nutrient content of the plant to be grown can be ascertained in the secondary detection step 47. Automatic irrigation and/or fertilizing of the plant then takes place in adaptation step 48. Secondary detection step 47 and adaptation step 48 are cyclically repeated, as indicated by the repetition loop 49. In particular, continuous and/or step-by-step monitoring and/or regulating of the water budget and/or the nutrient budget of the at least one plant to be grown can take place.

Further state parameters, for example an ambient temperature, can also be detected in secondary detection step 47. A further adaptation, for example, an adaptation of the temperature, can take place depending on the further state parameters in adaptation step 48.

The invention claimed is:

1. A light for growing plants, the light comprising:
   a light base body,
   at least one light source for generating light for growing at least one plant to be grown, at least one detection device for detecting at least one state parameter of the at least one plant to be grown, and
   at least one adjustment device for moving the at least one light source relative to the at least one plant to be grown depending on the at least one state parameter detected by the at least one detection device,
   wherein the at least one adjustment device includes at least one boom pivotably mounted in relation to the light base body,
   wherein the at least one light source is arranged to be moved in relation to the light base body upon pivoting the at least one boom and to be movable along the at least one boom, and
   wherein the at least one adjustment device includes a linear drive, wherein the at least one boom is coupled via a coupling element to the linear drive of the at least one adjustment device, and wherein the at least one light source is coupled to the linear drive of the at least one adjustment device so that the movement of the at least one light source along the at least one boom depends on the pivot position of the at least one boom.

2. The light as claimed in claim 1, wherein the at least one light source is arranged on at least one flexible substrate.

3. The light as claimed in claim 2, wherein the at least one flexible substrate is movable along at least one boom of the at least one adjustment device.

4. The light as claimed in claim 2, wherein the at least one flexible substrate is coupled to a linear drive of the at least one adjustment device.

5. The light as claimed in claim 1, further comprising at least two light sources, wherein the at least two light sources are arranged such that light is irradiable from at least two sides onto the at least one plant to be grown by means of the at least two light sources.

6. The light as claimed in claim 1, wherein the at least one detection device includes at least one of at least one spectrometer, at least one distance sensor and at least one 3D scanner.

7. The light as claimed in claim 1, further comprising at least one secondary detection device for detecting at least one further state parameter of the at least one plant to be grown.

8. An apparatus for growing plants, the apparatus comprising:

at least one light as claimed in claim 1 and at least one vessel for accommodating at least one plant substrate.

9. The apparatus as claimed in claim 8, further comprising at least one of at least one liquid reservoir and at least one fertilizer reservoir for supplying the at least one plant to be grown with at least one of liquid and fertilizer depending on at least one detected state parameter of the at least one plant to be grown.

10. The light as claimed in claim 1, wherein the at least one light source is arranged along a flexible substrate in the form of a light band that is configured to be guided by a linear guide on the at least one boom to provide relative linear movement of the light band in relation to the boom.

11. The light as claimed in claim 1, wherein the light base body includes a stand arranged in a central location of the light, and wherein the stand extends in a vertical direction with the at least one boom being pivotally mounted to extend out from the light base body.

12. A method for growing plants, the method comprising:

providing at least one plant to be grown, providing a light as claimed in claim 1, irradiating light onto the at least one plant to be grown by means of the at least one light source, detecting at least one state parameter of the at least one plant to be grown by means of the at least one detection device, and moving the at least one light source relative to the at least one plant to be grown depending on the at least one state parameter by means of the at least one adjustment device.

13. The method as claimed in claim 12, wherein at least one of a leaf area index and a size of the at least one plant is detected by means of the at least one detection device.

14. The method as claimed in claim 12, wherein an emission characteristic of the at least one light source is varied depending on the at least one state parameter detected.

15. The method as claimed in claim 12, wherein at least one additional state parameter of the at least one plant to be grown is ascertained.

16. The method as claimed in claim 15, wherein at least one of the water content and the nutrient content of the at least one plant is ascertained.

17. The method as claimed in claim 12, further comprising a calibration step for determining a starting configuration of the light at the beginning of growing the plants.

18. The method as claimed in claim 12, wherein the movement of the at least one light source takes place in at least two degrees of freedom.

19. The method as claimed in claim 18, wherein the movement in different degrees of freedom takes place in a coupled manner.

20. The method as claimed in claim 12, further comprising a calibration step for determining at least one of a position and an emission characteristic of the at least one light source at the beginning of growing the plants.

* * * * *